United States Patent
Kim et al.

(10) Patent No.: US 12,017,350 B2
(45) Date of Patent: Jun. 25, 2024

(54) ROBOT

(71) Applicant: LG ELECTRONICS INC., Seoul (KR)

(72) Inventors: Moonchan Kim, Seoul (KR); Taiwoo Kim, Seoul (KR); Wondong Lee, Seoul (KR); Sanghun Mun, Seoul (KR); Yoonhyouk Cheong, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 303 days.

(21) Appl. No.: 17/491,358

(22) Filed: Sep. 30, 2021

(65) Prior Publication Data

US 2022/0111508 A1 Apr. 14, 2022

(30) Foreign Application Priority Data

Oct. 8, 2020 (KR) .......................... 10-2020-0130026
Sep. 9, 2021 (KR) .......................... 10-2021-0120269

(51) Int. Cl.
*B25J 5/00* (2006.01)
*B25J 9/12* (2006.01)
*B25J 19/00* (2006.01)

(52) U.S. Cl.
CPC .............. *B25J 5/007* (2013.01); *B25J 9/126* (2013.01); *B25J 19/0091* (2013.01)

(58) Field of Classification Search
CPC ......... B25J 5/007; B25J 9/126; B25J 19/0091
See application file for complete search history.

(56) References Cited

U.S. PATENT DOCUMENTS 8,924,018 B2 * 12/2014 Lee .......................... B25J 5/007
                                                       700/259
2020/0206916 A1    7/2020 Jung et al.

FOREIGN PATENT DOCUMENTS

| JP | 2000351385 | | 12/2000 | |
|----|-----------|---|---------|---|
| JP | 2000351385 A | * | 12/2000 | |
| JP | 2001277808 | | 10/2001 | |
| JP | 2003312480 | | 11/2003 | |
| JP | 2003312480 A | * | 11/2003 | |
| JP | 2008126936 | | 6/2008 | |
| KR | 2004008373 A | * | 1/2004 | .............. B25J 5/00 |
| KR | 1020040008373 | | 1/2004 | |
| KR | 20200085661 | | 7/2020 | |
| WO | WO-2021040199 A1 | * | 3/2021 | ............. B25J 19/02 |

OTHER PUBLICATIONS

Machine translation KR-2004008373-A (Year: 2004).*
PCT International Application No. PCT/KR2021/011668, International Search Report dated Nov. 24, 2021, 10 pages.

* cited by examiner

*Primary Examiner* — Kawing Chan
(74) *Attorney, Agent, or Firm* — LEE, HONG, DEGERMAN, KANG & WAIMEY

(57) ABSTRACT

A robot may include a robot frame having a bottom plate, and a rear caster and a wheel module disposed on the bottom plate, wherein the wheel module may include a link base mounted in the bottom plate to be spaced apart from the rear caster, a rotation damper mounted in the link base and having an elastic member accommodated therein, a front link connected to the rotation damper through a connecting shaft, a front caster mounted in a front portion of the front link, a drive motor mounted in a rear portion of the front link, and a drive wheel configured to be rotated by the drive motor.

9 Claims, 11 Drawing Sheets

(a)

(b)

ROBOT

CROSS-REFERENCE TO RELATED APPLICATIONS

Pursuant to 35 U.S.C. § 119(a), this application claims the benefit of earlier filing date and right of priority to Korean Patent Application Nos. 10-2020-0130026, filed on Oct. 8, 2020, and 10-2021-0120269, filed on Sep. 9, 2021, the contents of which are hereby incorporated by reference herein in its entirety.

BACKGROUND OF THE INVENTION

1. Field of the Invention

The present disclosure relates to a robot, and more particularly, to a robot having a drive wheel and a caster.

2. Discussion of the Related Art

A robot is a machine that automatically handles or operates a given task by its own ability. The robot's application field is generally classified into various fields such as industrial, medical, space, submarine, and the like, and can be used in various fields.

An example of the robot may include a drive wheel, a front caster, and a rear caster, which is disclosed in Korean Patent Publication No. 10-2020-0085661 (published on Jul. 15, 2020). The robot includes a body provided with a driving unit, and the driving unit includes a drive wheel configured to rotate about a driving shaft elongated from left to right; a drive motor configured to provide a rotational force to the drive wheel; a front caster provided in a front portion of a bottom surface of the body; and a rear caster provided in a rear portion of the bottom surface of the body.

When the front caster meets an obstacle and rides over the obstacle, the front caster is lifted, and therefore, the drive wheel may be separated from the ground, so that the drive wheel may be not driven due to loss of a grip force. In addition, a shock is transmitted to an upper portion of the robot, making it difficult to maintain a delivery item carried by the robot.

SUMMARY OF THE INVENTION

An object of the present disclosure is to provide a robot capable of absorbing a shock caused when passing through an uneven ground and maintaining a grip force of a drive wheel at the same time.

Another object of the present disclosure is to provide a robot capable of minimizing shaking that may occur when the robot crosses an obstacle.

A robot may include a robot frame having a bottom plate, and a rear caster and a wheel module disposed on the bottom plate.

The wheel module may include a link base mounted in the bottom plate to be spaced apart from the rear caster, a rotation damper mounted in the link base and having an elastic member accommodated therein, a front link connected to the rotation damper through a connecting shaft, a front caster mounted in a front portion of the front link, a drive motor mounted in a rear portion of the front link, and a drive wheel configured to be rotated by the drive motor.

The front link may be spaced apart from the bottom plate in a vertical direction.

The rotation damper may further include an outer damper body having a space therein, and an inner damper body accommodated in the space, the connecting shaft being connected to the inner damper body. The elastic member may be disposed between the outer damper body and the inner damper body.

The outer damper body and the inner damper body have a polygonal shape.

The plurality of elastic members may be provided between the outer damper body and the inner damper body.

The plurality of elastic members may be spaced apart from one another.

The rotation damper may further include a damper case in which the outer damper body, the elastic member, and the inner damper body are accommodated. The tamper case may be coupled to the link base.

The front link may include a pair of side bodies spaced apart from each other, and a lower body configured to connect lower ends of the pair of side bodies.

An accommodation space in which the rotation damper may be accommodated is formed between the pair of side bodies.

An opening through which a drive motor passes may be formed in an inner side body of the pair of side bodies.

The link base may include an upper fastening portion fastened to the bottom plate and a lower accommodation portion in which the rotation damper is accommodated.

The lower accommodation portion may be disposed between the pair of bodies.

The pair of side bodies may be configured to shield between the lower accommodation portion and the rotation damper.

A pair of connecting shafts may be provided. A pair of through-holes through which the pair of connecting shafts pass may be formed in the pair of side bodies.

According to the present embodiment, it is possible to minimize the vibration transmitted to the robot frame by absorbing a shock when the robot passes through an obstacle.

In addition, even when the front caster is lifted in the upward direction, the front link may press the drive motor in the downward direction, and the grip force of the drive wheel is maintained, so that the robot can travel stably.

In addition, a load applied to the front caster by the front link can be minimized, and when the front caster meets an obstacle, a shock load applied to the front caster is minimized, and damage and breakage to the front caster is minimized.

In addition, the side body of the front link may protect the rotation damper on the side of the rotation damper, and it is possible to minimize penetration of foreign substances such as dust into the rotation damper.

DETAILED DESCRIPTION OF THE PREFERRED EMBODIMENTS

Figure 1:
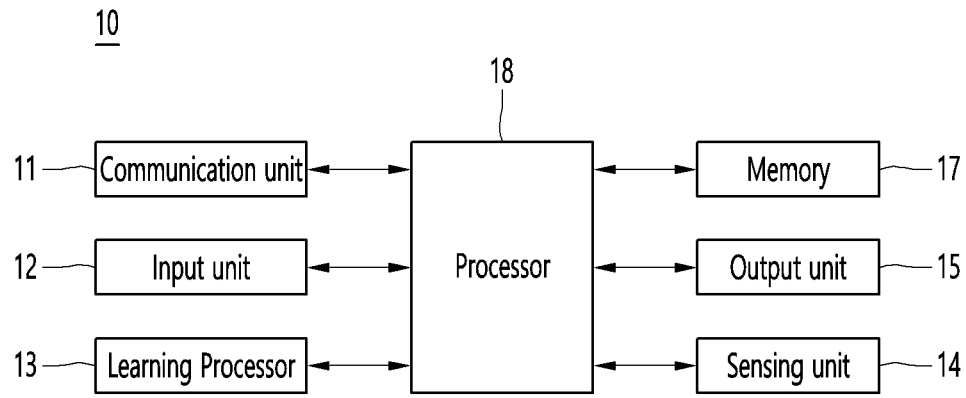
FIG. 1 illustrates an AI device including a robot according to the present embodiment.

Hereinafter, detailed embodiments will be described in detail with reference to the accompanying drawings.

<Robot>

A robot may refer to a machine that automatically processes or operates a given task by its own ability. In particular, a robot having a function of recognizing an environment and performing a self-determination operation may be referred to as an intelligent robot.

Robots may be classified into industrial robots, medical robots, home robots, military robots, and the like according to the use purpose or field.

The robot includes a driving unit may include an actuator or a motor and may perform various physical operations such as moving a robot joint. In addition, a movable robot may include a wheel, a brake, a propeller, and the like in a driving unit, and may travel on the ground through the driving unit or fly in the air.

<Artificial Intelligence (AI)>

Artificial intelligence refers to the field of studying artificial intelligence or methodology for making artificial intelligence, and machine learning refers to the field of defining various issues dealt with in the field of artificial intelligence and studying methodology for solving the various issues. Machine learning is defined as an algorithm that enhances the performance of a certain task through a steady experience with the certain task.

An artificial neural network (ANN) is a model used in machine learning and may mean a whole model of problem-solving ability which is composed of artificial neurons (nodes) that form a network by synaptic connections. The artificial neural network can be defined by a connection pattern between neurons in different layers, a learning process for updating model parameters, and an activation function for generating an output value.

The artificial neural network may include an input layer, an output layer, and optionally one or more hidden layers. Each layer includes one or more neurons, and the artificial neural network may include a synapse that links neurons to neurons. In the artificial neural network, each neuron may output the function value of the activation function for input signals, weights, and deflections input through the synapse.

Model parameters refer to parameters determined through learning and include a weight value of synaptic connection and deflection of neurons. A hyperparameter means a parameter to be set in the machine learning algorithm before learning, and includes a learning rate, a repetition number, a mini batch size, and an initialization function.

The purpose of the learning of the artificial neural network may be to determine the model parameters that minimize a loss function. The loss function may be used as an index to determine optimal model parameters in the learning process of the artificial neural network.

Machine learning may be classified into supervised learning, unsupervised learning, and reinforcement learning according to a learning method.

The supervised learning may refer to a method of learning an artificial neural network in a state in which a label for learning data is given, and the label may mean the correct answer (or result value) that the artificial neural network must infer when the learning data is input to the artificial neural network. The unsupervised learning may refer to a method of learning an artificial neural network in a state in which a label for learning data is not given. The reinforcement learning may refer to a learning method in which an agent defined in a certain environment learns to select a behavior or a behavior sequence that maximizes cumulative compensation in each state.

Machine learning, which is implemented as a deep neural network (DNN) including a plurality of hidden layers among artificial neural networks, is also referred to as deep learning, and the deep learning is part of machine learning. In the following, machine learning is used to mean deep learning.

<Self-Driving>

Self-driving refers to a technique of driving for oneself, and a self-driving vehicle refers to a vehicle that travels without an operation of a user or with a minimum operation of a user.

For example, the self-driving may include a technology for maintaining a lane while driving, a technology for automatically adjusting a speed, such as adaptive cruise control, a technique for automatically traveling along a predetermined route, and a technology for automatically setting and traveling a route when a destination is set.

The vehicle may include a vehicle having only an internal combustion engine, a hybrid vehicle having an internal combustion engine and an electric motor together, and an electric vehicle having only an electric motor, and may include not only an automobile but also a train, a motorcycle, and the like.

At this time, the self-driving vehicle may be regarded as a robot having a self-driving function.

FIG. 1 illustrates an AI device 10 including a robot according to an embodiment of the present disclosure.

The AI device 10 may be implemented by a stationary device or a mobile device, such as a TV, a projector, a mobile phone, a smartphone, a desktop computer, a notebook, a digital broadcasting terminal, a personal digital assistant (PDA), a portable multimedia player (PMP), a navigation device, a tablet PC, a wearable device, a set-top box (STB), a DMB receiver, a radio, a washing machine, a refrigerator, a desktop computer, a digital signage, a robot, a vehicle, and the like.

Referring to FIG. 1, the AI device 10 may include a communicator 11, an input interface 12, a learning processor 13, a sensor 14, an output interface 15, a memory 17, and a processor 18.

The communicator 11 may transmit and receive data to and from external devices such as other AI devices 10a to 10e and the AI server 20 by using wire/wireless communication technology. For example, the communicator 11 may transmit and receive sensor information, a user input, a learning model, and a control signal to and from external devices.

The communication technology used by the communicator 11 includes GSM (Global System for Mobile communication), CDMA (Code Division Multi Access), LTE (Long Term Evolution), 5G, WLAN (Wireless LAN), Wi-Fi (Wireless-Fidelity), Bluetooth™, RFID (Radio Frequency Identification), Infrared Data Association (IrDA), ZigBee, NFC (Near Field Communication), and the like.

The input interface 12 may acquire various kinds of data.

At this time, the input interface 12 may include a camera for inputting a video signal, a microphone for receiving an audio signal, and a user input interface for receiving information from a user. The camera or the microphone may be treated as a sensor, and the signal acquired from the camera or the microphone may be referred to as sensing data or sensor information.

The input interface 12 may acquire a learning data for model learning and an input data to be used when an output is acquired by using learning model. The input interface 12 may acquire raw input data. In this case, the processor 18 or the learning processor 13 may extract an input feature by preprocessing the input data.

The learning processor 13 may learn a model composed of an artificial neural network by using learning data. The learned artificial neural network may be referred to as a learning model. The learning model may be used to an infer result value for new input data rather than learning data, and the inferred value may be used as a basis for determination to perform a certain operation.

At this time, the learning processor 13 may perform AI processing together with the learning processor 24 of the AI server 20.

At this time, the learning processor 13 may include a memory integrated or implemented in the AI device 10. Alternatively, the learning processor 13 may be implemented by using the memory 17, an external memory directly connected to the AI device 10, or a memory held in an external device.

The sensor 14 may acquire at least one of internal information about the AI device 10, ambient environment information about the AI device 10, and user information by using various sensors.

Examples of the sensors included in the sensor 14 may include a proximity sensor, an illuminance sensor, an acceleration sensor, a magnetic sensor, a gyro sensor, an inertial sensor, an RGB sensor, an IR sensor, a fingerprint recognition sensor, an ultrasonic sensor, an optical sensor, a microphone, a lidar, and a radar.

The output interface 15 may generate an output related to a visual sense, an auditory sense, or a haptic sense.

At this time, the output interface 15 may include a display unit for outputting time information, a speaker for outputting auditory information, and a haptic module for outputting haptic information.

The memory 17 may store data that supports various functions of the AI device 10. For example, the memory 17 may store input data acquired by the input interface 12, learning data, a learning model, a learning history, and the like.

The processor 18 may determine at least one executable operation of the AI device 10 based on information determined or generated by using a data analysis algorithm or a machine learning algorithm. The processor 18 may control the components of the AI device 10 to execute the determined operation.

To this end, the processor 18 may request, search, receive, or utilize data of the learning processor 13 or the memory 17. The processor 18 may control the components of the AI device 10 to execute the predicted operation or the operation determined to be desirable among the at least one executable operation.

When the connection of an external device is required to perform the determined operation, the processor 18 may generate a control signal for controlling the external device and may transmit the generated control signal to the external device.

The processor 18 may acquire intention information for the user input and may determine the user's requirements based on the acquired intention information.

The processor 18 may acquire the intention information corresponding to the user input by using at least one of a speech to text (STT) engine for converting speech input into a text string or a natural language processing (NLP) engine for acquiring intention information of a natural language.

At least one of the STT engine or the NLP engine may be configured as an artificial neural network, at least part of which is learned according to the machine learning algorithm. At least one of the STT engine or the NLP engine may be learned by the learning processor 13, may be learned by the learning processor 24 of the AI server 20, or may be learned by their distributed processing.

The processor 18 may collect history information including the operation contents of the AI apparatus 10 or the user's feedback on the operation and may store the collected history information in the memory 17 or the learning processor 13 or transmit the collected history information to the external device such as the AI server 20. The collected history information may be used to update the learning model.

The processor 18 may control at least part of the components of AI device 10 so as to drive an application program stored in memory 17. Furthermore, the processor 18 may operate two or more of the components included in the AI device 10 in combination so as to drive the application program.

Figure 2:
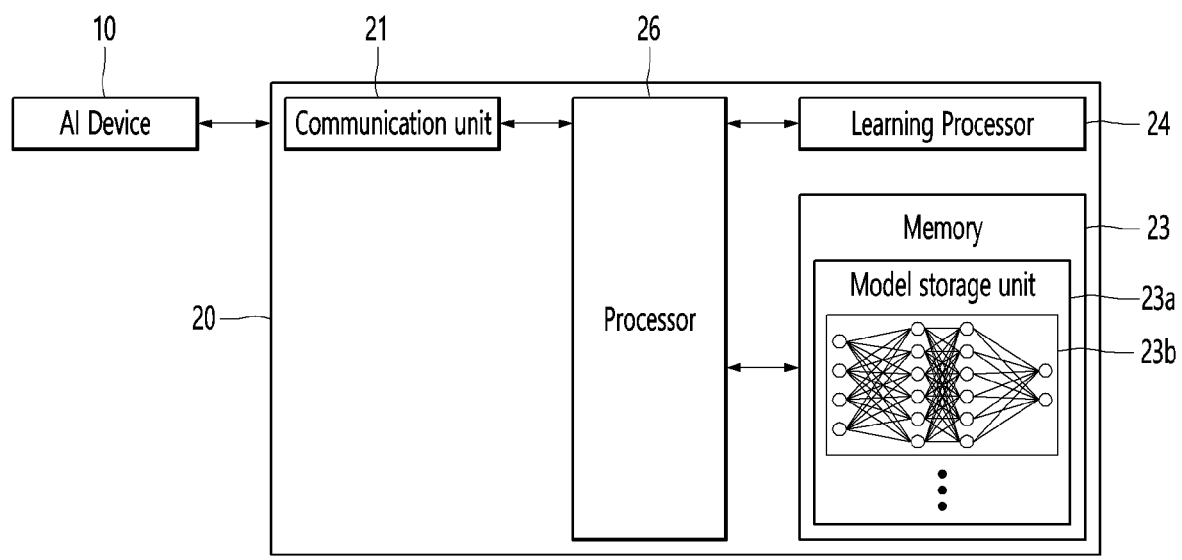
FIG. 2 illustrates an AI server connected to a robot according to the present embodiment.

FIG. 2 illustrates an AI server connected to a robot according to an embodiment of the present disclosure.

Referring to FIG. 2, the AI server 20 may refer to a device that learns an artificial neural network by using a machine learning algorithm or uses a learned artificial neural network. The AI server 20 may include a plurality of servers to perform distributed processing, or may be defined as a 5G network. At this time, the AI server 20 may be included as a partial configuration of the AI device 10, and may perform at least part of the AI processing together.

The AI server 20 may include a communicator 21, a memory 23, a learning processor 24, a processor 26, and the like.

The communicator 21 can transmit and receive data to and from an external device such as the AI device 10.

The memory 23 may include a model storage unit 23a. The model storage unit 23a may store a learning or learned model (or an artificial neural network 26b) through the learning processor 24.

The learning processor 24 may learn the artificial neural network 26b by using the learning data. The learning model may be used in a state of being mounted on the AI server 20 of the artificial neural network, or may be used in a state of being mounted on an external device such as the AI device 10.

The learning model may be implemented in hardware, software, or a combination of hardware and software. If all or part of the learning models are implemented in software, one or more instructions that constitute the learning model may be stored in memory 23.

The processor 26 may infer the result value for new input data by using the learning model and may generate a response or a control command based on the inferred result value.

Figure 3:
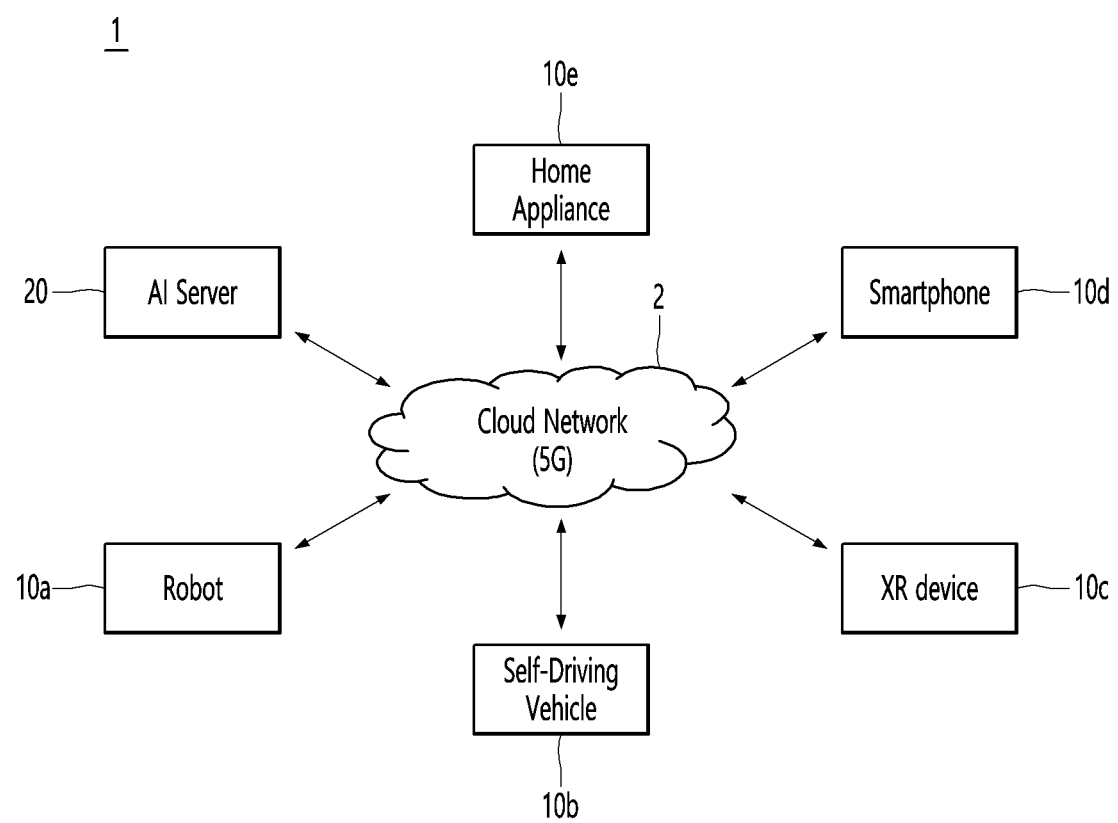
FIG. 3 illustrates an AI system according to the present embodiment.

FIG. 3 illustrates an AI system 1 according to an embodiment of the present disclosure.

Referring to FIG. 3, in the AI system 1, at least one of an AI server 20, a robot 10a, a self-driving vehicle 10b, an XR device 10c, a smartphone 10d, or a home appliance 10e is connected to a cloud network 2. The robot 10a, the self-driving vehicle 10b, the XR device 10c, the smartphone 10d, or the home appliance 10e, to which the AI technology is applied, may be referred to as AI devices 10a to 10e.

The cloud network 2 may refer to a network that forms part of a cloud computing infrastructure or exists in a cloud computing infrastructure. The cloud network 2 may be configured by using a 3G network, a 4G or LTE network, or a 5G network.

That is, the devices 10a to 10e and 20 configuring the AI system 1 may be connected to each other through the cloud network 2. In particular, each of the devices 10a to 10e and 20 may communicate with each other through a base station, but may directly communicate with each other without using a base station.

The AI server 20 may include a server that performs AI processing and a server that performs operations on big data.

The AI server 20 may be connected to at least one of the AI devices constituting the AI system 1, that is, the robot 10a, the self-driving vehicle 10b, the XR device 10c, the smartphone 10d, or the home appliance 10e through the cloud network 2, and may assist at least part of AI processing of the connected AI devices 10a to 10e.

At this time, the AI server 20 may learn the artificial neural network according to the machine learning algorithm instead of the AI devices 10a to 10e, and may directly store the learning model or transmit the learning model to the AI devices 10a to 10e.

At this time, the AI server 20 may receive input data from the AI devices 10a to 10e, may infer the result value for the received input data by using the learning model, may generate a response or a control command based on the inferred result value, and may transmit the response or the control command to the AI devices 10a to 10e.

Alternatively, the AI devices 10a to 10e may infer the result value for the input data by directly using the learning model, and may generate the response or the control command based on the inference result.

Hereinafter, various embodiments of the AI devices 10a to 10e to which the above-described technology is applied will be described. The AI devices 10a to 10e illustrated in FIG. 3 may be regarded as a specific embodiment of the AI device 10 illustrated in FIG. 1.

<AI+Robot>

The robot 10a, to which the AI technology is applied, may be implemented as a guide robot, a carrying robot, a cleaning robot, a wearable robot, an entertainment robot, a pet robot, an unmanned flying robot, or the like.

The robot 10a may include a robot control module for controlling the operation, and the robot control module may refer to a software module or a chip implementing the software module by hardware.

The robot 10a may acquire state information about the robot 10a by using sensor information acquired from various kinds of sensors, may detect (recognize) surrounding environment and objects, may generate map data, may determine the route and the travel plan, may determine the response to user interaction, or may determine the operation.

The robot 10a may use the sensor information acquired from at least one sensor among the lidar, the radar, and the camera so as to determine the travel route and the travel plan.

The robot 10a may perform the above-described operations by using the learning model composed of at least one artificial neural network. For example, the robot 10a may recognize the surrounding environment and the objects by using the learning model, and may determine the operation by using the recognized surrounding information or object information. The learning model may be learned directly from the robot 10a or may be learned from an external device such as the AI server 20.

At this time, the robot 10a may perform the operation by generating the result by directly using the learning model, but the sensor information may be transmitted to the external device such as the AI server 20 and the generated result may be received to perform the operation.

The robot 10a may use at least one of the map data, the object information detected from the sensor information, or the object information acquired from the external apparatus to determine the travel route and the travel plan, and may control the driving unit such that the robot 10a travels along the determined travel route and travel plan.

The map data may include object identification information about various objects arranged in the space in which the robot 10a moves. For example, the map data may include object identification information about fixed objects such as walls and doors and movable objects such as pollen and desks. The object identification information may include a name, a type, a distance, and a position.

In addition, the robot 10a may perform the operation or travel by controlling the driving unit based on the control/interaction of the user. At this time, the robot 10a may acquire the intention information of the interaction due to the user's operation or speech utterance, and may determine the response based on the acquired intention information, and may perform the operation.

<AI+Robot+Self-Driving>

The robot 10a, to which the AI technology and the self-driving technology are applied, may be implemented as a guide robot, a carrying robot, a cleaning robot, a wearable robot, an entertainment robot, a pet robot, an unmanned flying robot, or the like.

The robot 10a, to which the AI technology and the self-driving technology are applied, may refer to the robot itself having the self-driving function or the robot 10a interacting with the self-driving vehicle 10b.

The robot 10a having the self-driving function may collectively refer to a device that moves for itself along the given movement line without the user's control or moves for itself by determining the movement line by itself.

The robot 10a and the self-driving vehicle 10b having the self-driving function may use a common sensing method so as to determine at least one of the travel route or the travel plan. For example, the robot 10a and the self-driving vehicle 10b having the self-driving function may determine at least one of the travel route or the travel plan by using the information sensed through the lidar, the radar, and the camera.

The robot 10a that interacts with the self-driving vehicle 10b exists separately from the self-driving vehicle 10b and may perform operations interworking with the self-driving function of the self-driving vehicle 10b or interworking with the user who rides on the self-driving vehicle 10b.

At this time, the robot 10a interacting with the self-driving vehicle 10b may control or assist the self-driving function of the self-driving vehicle 10b by acquiring sensor information on behalf of the self-driving vehicle 10b and providing the sensor information to the self-driving vehicle 10b, or by acquiring sensor information, generating environment information or object information, and providing the information to the self-driving vehicle 10b.

Alternatively, the robot 10a interacting with the self-driving vehicle 10b may monitor the user boarding the self-driving vehicle 10b, or may control the function of the self-driving vehicle 10b through the interaction with the user. For example, when it is determined that the driver is in a drowsy state, the robot 10a may activate the self-driving function of the self-driving vehicle 10b or assist the control of the driving unit of the self-driving vehicle 10b. The function of the self-driving vehicle 10b controlled by the robot 10a may include not only the self-driving function but also the function provided by the navigation system or the audio system provided in the self-driving vehicle 10b.

Alternatively, the robot 10a that interacts with the self-driving vehicle 10b may provide information or assist the function to the self-driving vehicle 10b outside the self-driving vehicle 10b. For example, the robot 10a may provide traffic information including signal information and the like, such as a smart signal, to the self-driving vehicle 10b, and automatically connect an electric charger to a charging port by interacting with the self-driving vehicle 10b like an automatic electric charger of an electric vehicle.

Figure 4:
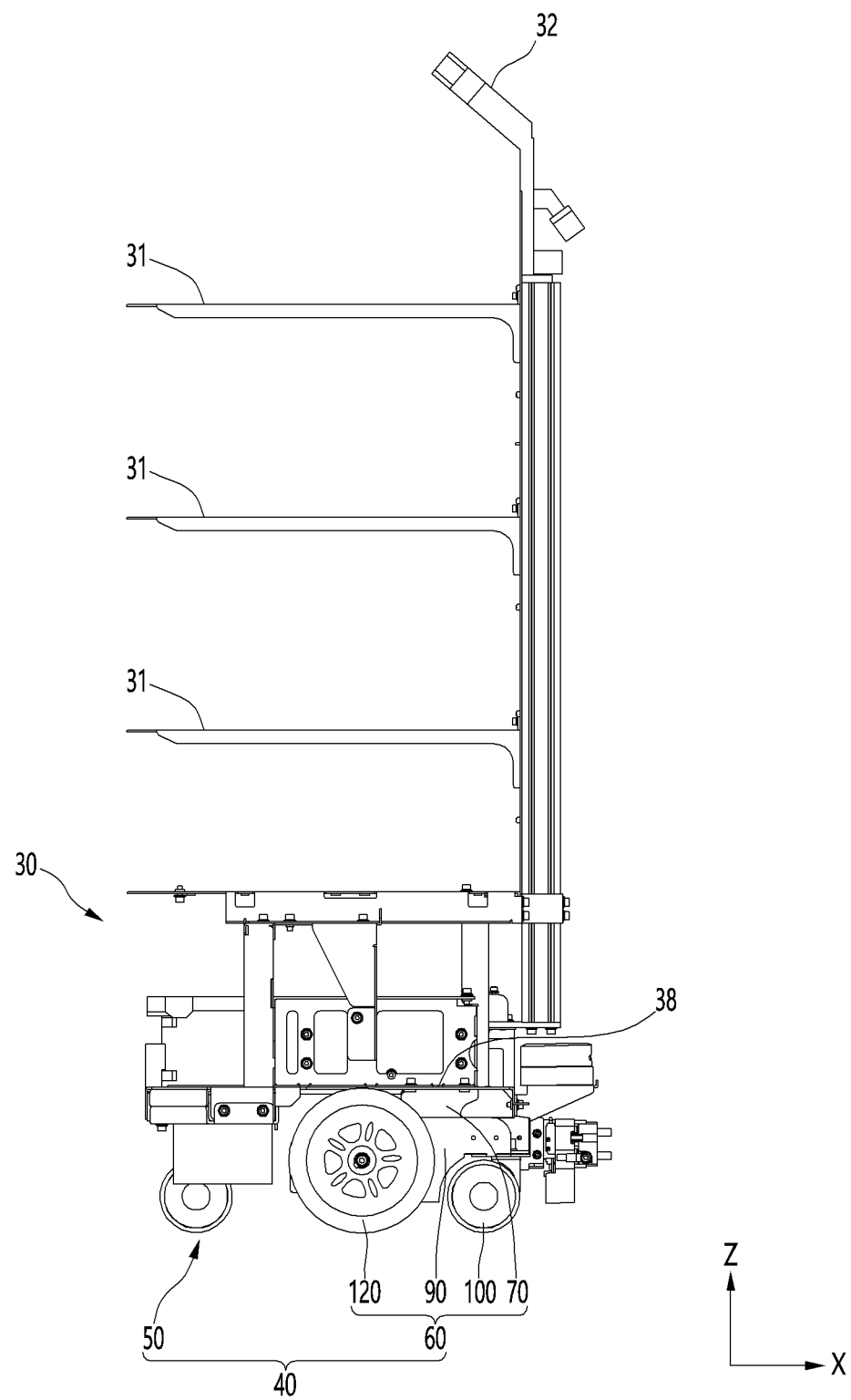
FIG. 4 is a side view of a robot according to an embodiment.
Figure 5:
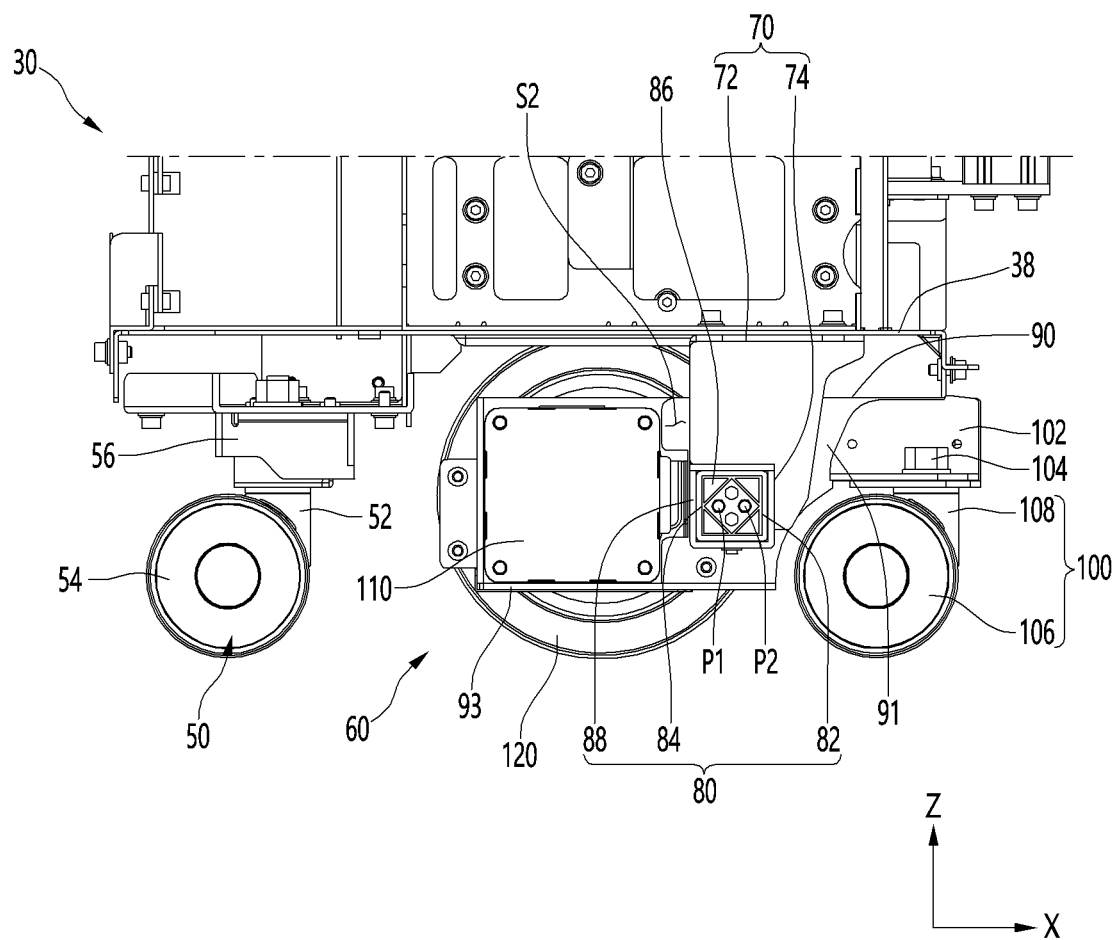
FIG. 5 is a view showing a rear caster and a wheel module according to the present embodiment.
Figure 6:
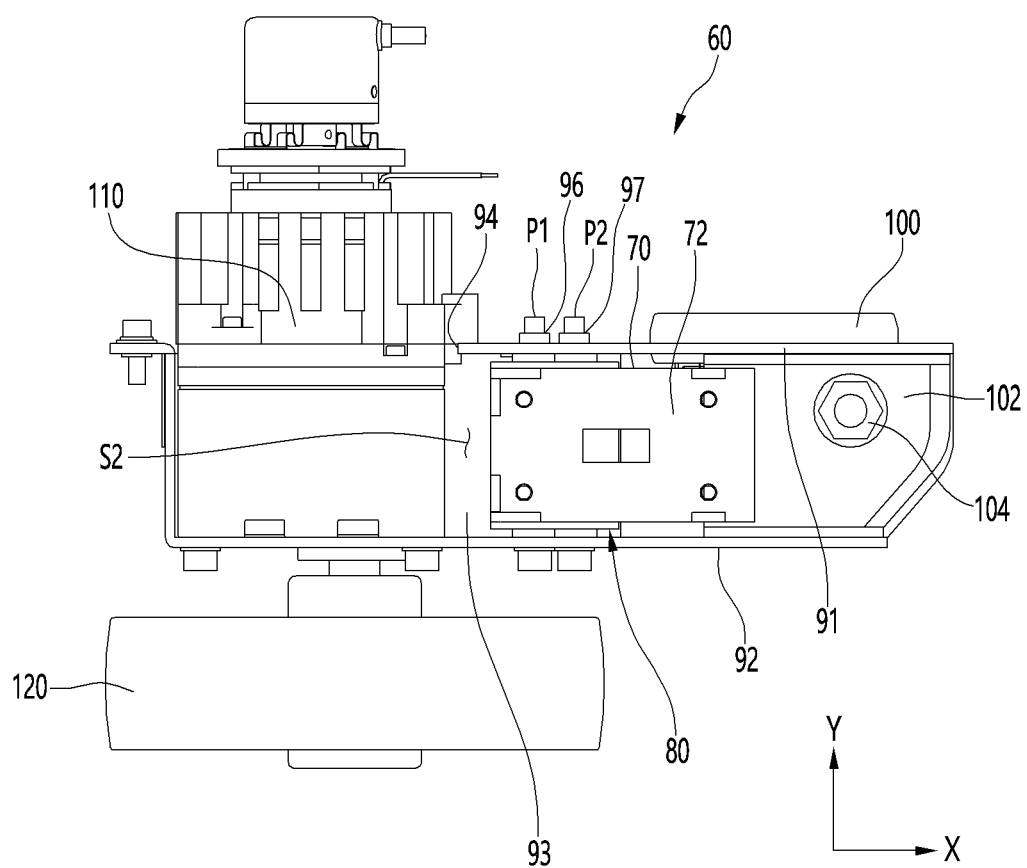
FIG. 6 is a plan view of a wheel module according to the present embodiment.
Figure 7:
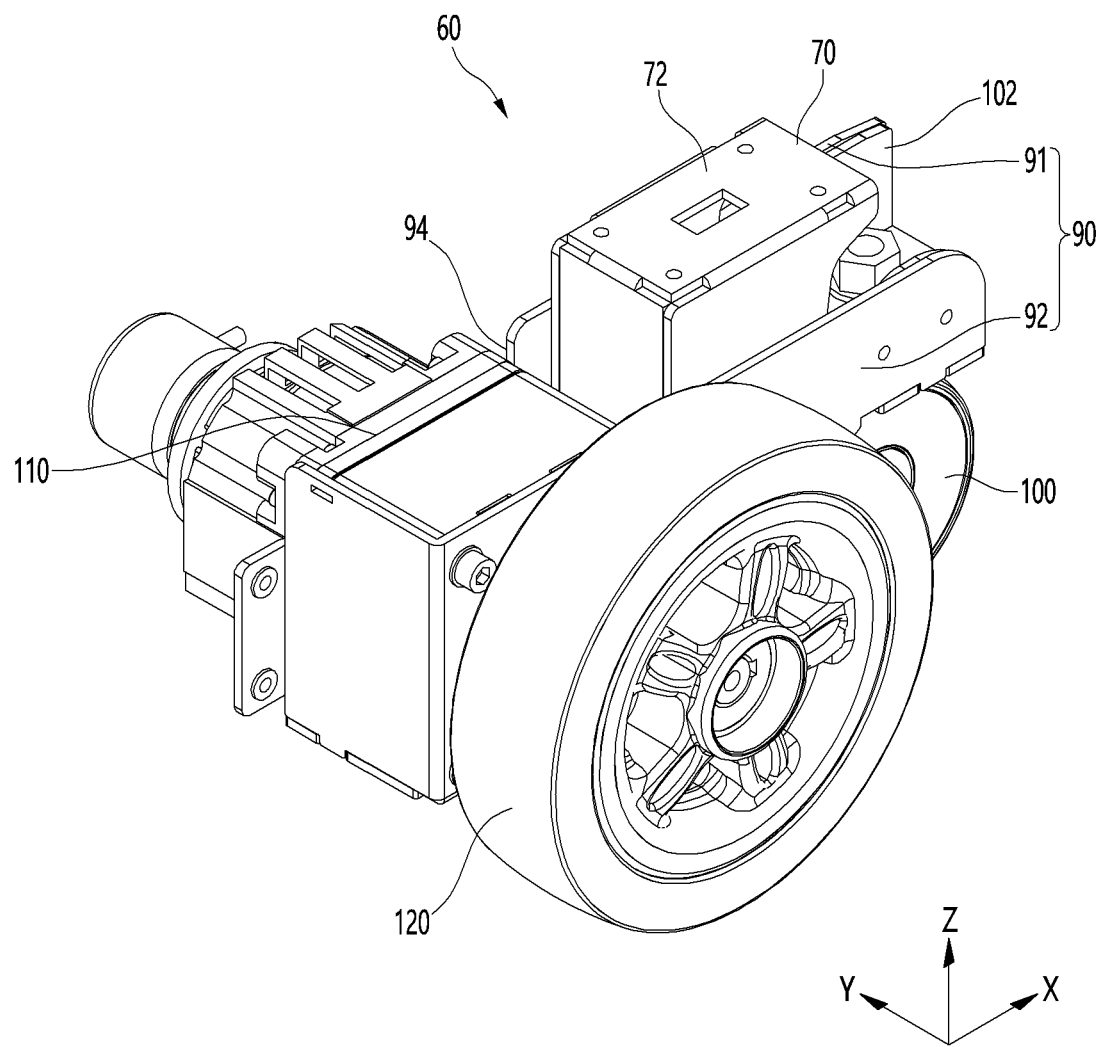
FIG. 7 is a perspective view of a wheel module according to the present embodiment.
Figure 8:
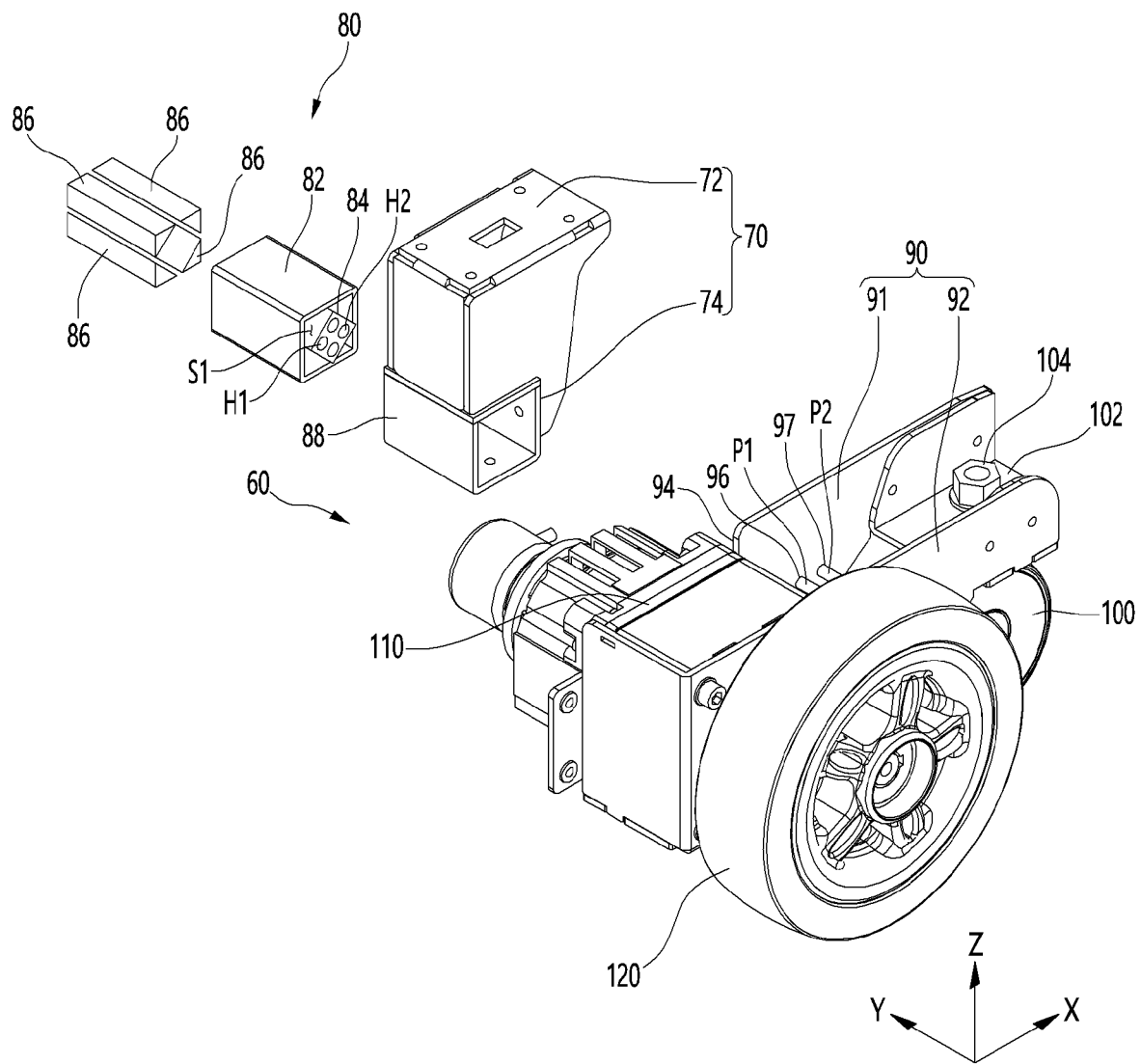
FIG. 8 is an exploded perspective view in which a rotation damper according to the present embodiment is disassembled.

FIG. 4 is a side view of a robot according to an embodiment, FIG. 5 is a view showing a rear caster and a wheel module according to the present embodiment, FIG. 6 is a plan view of a wheel module according to the present embodiment, FIG. 7 is a perspective view of a wheel module according to the present embodiment, and FIG. 8 is an exploded perspective view in which a rotation damper according to the present embodiment is disassembled.

A robot 10a may include a robot frame 30 and a drive part 40 mounted on the robot frame 30.

An example of the robot 10a may be a delivery robot capable of transporting various items such as food and medicine, or delivery item (hereinafter, collectively referred to as delivery item). When the robot 10a is a delivery robot, at least one carrier 31 (or a bracket) on which a delivery item is placed may be disposed in the robot frame 30.

The robot frame 30 may be made of an assembly of a plurality of members, and may be a robot body. A plurality of carriers 31 may be provided in the robot frame 30, and the plurality of carriers 31 may be disposed to be spaced apart from each other in the vertical direction (Z).

At least one interface unit 32 may be disposed in the robot frame 30. An example of the interface unit 32 may be a display unit.

The robot frame 30 may include a frame body and an outer cover that surrounds the frame body and forms an exterior of the robot 10a.

The robot frame 30 may include a bottom plate 38 that forms an exterior of a bottom of the robot frame 30. The bottom plate 38 may be disposed approximately horizontally.

The drive part 40 may be disposed in the bottom plate 38 to allow the robot 100a to travel in the front-rear direction X. The front-back direction X may be defined as a direction in which the robot 10a moves forward or backward, and the left-right direction U may be defined as a direction orthogonal to a direction in which the robot 10a moves forward or backward.

A plurality of drive parts 40 may be provided in the robot frame 30. An example of the plurality of drive parts may include a left drive part and a right drive part. The left drive part may be disposed on the left side of the robot frame 30 with respect to the center of the robot frame 30, and the right drive part may be disposed on the right side of the robot frame 30 with respect to the center of the robot frame 30.

The left drive part and the right drive part may be symmetrically disposed in the left-right direction. Hereinafter, a common configuration of the left drive part and the right drive part will be referred to as the drive part 40, which is described below.

The drive part 40 may include a rear caster 50 and a wheel module 60.

The rear caster 50 may be disposed in the bottom plate 38. The rear caster 50 may be disposed in a rear portion of the bottom plate 38.

The rear portion of the bottom plate 38 may be defined as a rear portion of the center of the robot frame 30 with respect to the center of the bottom plate 30 in the front-rear direction X.

As shown in FIG. 5, the rear caster 50 may include a caster body 52 having a vertical shaft and a caster wheel 54 disposed on the caster body 106 rotatably about a horizontal shaft.

An example of the vertical shaft of the caster body 52 may be directly coupled to the bottom plate 38.

Another example of the vertical shaft of the caster body 56 may be connected to the robot frame 30, in particular to a separate rear damper 56 arranged in the bottom plate 38.

The rear damper 56 may have an elastic member embedded therein, such as a spring, and absorb vibration transmitted to the robot frame 30 after the vibration is applied to the rear caster 50.

Hereinafter, the rear caster 50 and the caster body 52 being directly coupled to the bottom plate 38, and the rear caster 50 being connected to the rear damper 56 may be defined as the rear caster 50 being arranged in the bottom plate 38.

The wheel module 60 may be rotated about its central rotation shaft, and a shock absorbing device (or a shock absorbing member) may be disposed on the rotation shaft to absorb a shock when the rotation shaft is rotated.

One example of the wheel module 60 may include a link base (70), a rotation damper (80) mounted in the link base (70), a front link (90) connected to the rotation damper (80) through a connecting shafts P1 and P2, a front caster (100) mounted in a front portion of the front link (90), a drive motor (110) mounted in a rear portion of the front link (90), and a drive wheel (120) configured to be rotated by the drive motor (110).

The link base 70 may be mounted to the bottom plate 38 to be spaced apart from the rear caster 50.

The link base 70 may protrude downward from the bottom plate 38. The height of the lower end of the link base 70 may be lower than the height of the bottom plate 38.

As shown in FIGS. 5 and 8, the link base 70 may include an upper fastening portion 72 and a lower accommodation portion 74.

The upper fastening portion 72 may be fastened to the bottom plate 38. As shown in FIG. 5, the upper fastening portion 72 may be located under the bottom plate 38, and may be fastened to the bottom plate 38 using a fastening member such as a screw.

The upper fastening portion 72 may be coupled to the front portion of the bottom plate 38. The front portion of the bottom plate 38 may be defined as a front portion of the center of the robot frame 30 based on the center of the bottom plate 30 in the front-rear direction X.

The rotation damper 80 may be accommodated in the lower accommodation portion 74. The lower accommodation portion 74 may be formed with a groove in which a portion of the rotation damper 80 is accommodated. The lower accommodation portion 74 may be formed to be recessed in a lower portion of the link base 70.

The lower accommodation portion 74 may be positioned between a pair of side bodies 91 and 92 (see FIGS. 6 to 8) of the front link 90. The lower accommodation portion 74 may be protected by a pair of side bodies 91 and 92. The pair of side bodies 91 and 92 may minimize the penetration of foreign substances such as dust into the lower accommodation portion.

The rotation damper 80 may be mounted to be suspended from the link base 70.

The rotation damper 80 may be fastened to the lower accommodation portion 74 of the link base 70 through a fastening member such as a screw. The rotation damper 80 may be fixed to the link base 70 by being fastened to the lower accommodation portion 74.

The rotation damper 80 may include an elastic member 86. When the front link 70 is rotated, it is possible to absorb a shock. The elastic member 86 may be accommodated in the rotation damper 80.

A load of the robot 10a may be applied to the front link 90 through the rotation damper 80, and the vibration applied to the front link 90 may be transmitted to the link base 70 through the rotation damper 80, and may be absorbed by the elastic member 86.

The rotation damper 80 may include an outer damper body 82, an inner damper body 84, and at least one elastic member 86.

The outer damper body 82 may be a fixed body among the rotation dampers 80.

A space S1 may be formed inside the outer damper body 82. The outer damper body 82 may have a polygonal shape. The outer body 82 may have a hollow rectangular parallelepiped shape in which a space S1 (see FIG. 8) is formed. The outer body 82 may be opened in the left-right direction Y.

The inner damper body 84 may be a variable body that is rotated or moved among the rotation dampers 80.

The size of the inner damper body 84 may be smaller than the size of the outer damper body 82, and the inner damper body 84 may be accommodated in the space S1.

The length of the inner damper body 84 in the vertical direction Z may be slightly less than the length of the space S1 in the vertical direction Z.

The inner damper body 84 may have a polygonal shape like the outer damper body 82. The inner damper body 84 may have a rectangular parallelepiped shape. The inner damper body 84 may be rotated or moved inside the outer damper body 82. When the arrangement angle of the front link 90 is changed, the inner damper body 84 may be moved together with the front link 90.

The inner damper body 84 may be a rotation shaft (or tilting shaft) of the front link 90, and the front link 90 may be tilted in an upward direction or a downward direction with the inner damper body 84 as a center.

The inner damper body 84 may be connected to the front link 90 through the connecting shafts P1 and P2.

The connecting shafts P1 and P2 may be connected to the inner damper body 84. The inner damper body 84 may have connecting shaft through-holes H1 and H2 through which the connecting shafts P1 and P2 pass.

The connecting shaft through-holes H1 and H2 may be opened in the left-right direction Y as shown in FIG. 8.

The connecting shafts P1 and P2 and the connecting shaft through-holes H1 and H2 may have a 1:1 correspondence. The rotation damper 80 may include a pair of connecting shafts P1 and P2, and a pair of connecting shaft through-holes H1 and H2 may be formed in the inner damper body 84.

The inner damper body 84 may be rotated or moved within the outer damper body 82 together with the connecting shafts P1 and P2.

The elastic member 86 may be disposed between the outer damper body 82 and the inner damper body 84.

A plurality of elastic members 86 may be provided between the outer damper body 82 and the inner damper body 84. The plurality of elastic members 86 may be spaced apart from each other.

When the inner damper body 84 is rotated or moved in the space S1 of the outer damper body 82, at least one of the plurality of elastic members 86 may be compressed between the outer damper body 82 and the inner damper body 84 to absorb shock. The elastic member 86 may be elongated in the left-right direction Y. Each of the plurality of elastic members 86 may be disposed between the outer surface of the inner damper body 84 and the inner surface of the outer damper body 82.

Each of the outer surface of the inner damper body 84 and the inner surface of the outer damper body 82 may have a rectangular shape, the inner surface of the elastic member 86 may be in contact with the outer surface of the inner damper body 84, and two outer surfaces of the elastic member 86 may be in contact with the inner surface of the outer damper body 82.

The cross-sectional shape of the elastic member 86 may be approximately triangular.

The rotation damper 80 may include a total of four elastic members 86.

The elastic member 86 preferably has an elastic force such that the damping amount is not too high for a smooth tilting operation of the front link 90. An example of the elastic member 86 may be made of a rubber material.

An example of the rotation damper 80 may further include a damper case 88.

The damper case 88 may be coupled to the link base 70. The damper case 88 may be coupled to the link base 70 through a fastening member such as a screw. The damper case 88 may be provided with a fastening portion fastened to the lower accommodation portion 74 of the link base 70 using a screw or the like.

The outer damper body 82, the inner damper body 84, and the elastic member 86 may be accommodated in the damper case 88. The damper case 88 may be fastened to the link base 70 to protect the outer damper body 82.

As another example of the rotation damper 80, it is of course possible that the outer damper body 82 is fastened to the link base 70 without a separate damper case 88.

The front link 90 may be spaced apart from the bottom plate 38 in the vertical direction Z.

The front link 90 may be elongated in the front-rear direction X under the front frame 30.

The front link 90 may be tilted clockwise or counterclockwise around the rotational center of the rotation damper 80.

When the front caster 100 is lifted upward by an obstacle, the front link 90 may allow the drive motor 110 and the drive wheel 120 to descend downward.

When the drive motor 110 and the drive wheel 120 are lifted upward by an obstacle, the front link 90 may allow the front caster 100 to descend downward.

The front link 90 may include a pair of side bodies 91 and 92 and a lower body 93.

The pair of side bodies 91 and 92 may be spaced apart from each other, and may be spaced apart from each other in the left-right direction Y.

A side body disposed on the inner side among the pair of side bodies 91 and 92, may be defined as an inner side body 91, and a side body disposed on the outer side among the pair of side bodies 91 and 92 may be defined as an outer side body 92.

An opening 94 through which the drive motor 110 passes may be formed in the inner side body 91.

An accommodation space S2 in which the rotation damper 80 is accommodated may be formed between the pair of side bodies 91 and 92 as shown in FIGS. 5 and 6.

The pair of side bodies 91 and 92 may shield between the lower accommodation portion 74 and the rotation damper 80.

The pair of side bodies 91 and 92 may protect the rotation damper 80 on the side of the rotation damper 80. The pair of side bodies 91 and 92 may function as a damper cover that protects the rotation damper 80.

The pair of side bodies 91 and 92 may minimize penetration of foreign substances such as dust into the rotation damper 80.

A pair of through-holes 96 and 97 (see FIGS. 6 and 8) through which the pair of connecting shafts P1 and P2 pass may be formed in each of the pair of side bodies 91 and 92.

The lower body 93 may connect the lower ends of the pair of side bodies 91 and 92. The lower body 93 may form the exterior of a bottom surface of the front link 90.

The front caster 100 may be installed in the front portion of the front link 90 by the caster bracket 102. A portion of the front link 90 positioned in front of the rotation damper 90 with respect to the rotation damper 90 may be defined as a front portion of the front link 90.

The caster bracket 102 may be disposed between the pair of side bodies 91 and 92.

The front caster 100 may be connected to the caster bracket 102 and the fastening member 104.

The front caster 100 may be spaced apart from the bottom plate 38 in the vertical direction Z.

The front caster 100 may include a caster body 106 having a vertical shaft, and a caster wheel 108 arranged on the caster body 106 to rotate about a horizontal shaft.

The vertical shaft of the caster body 106 may be coupled to the fastening member 104.

The drive motor 110 may be fastened to the front link 90 through a fastening member such as a screw.

A portion of the drive motor 110 may be accommodated in a rear portion of the front link 90. A portion of the front link 90 positioned in front of the rotation damper 90 with respect to the rotation damper 90 may be defined as a rear portion of the front link 90.

A portion of the drive motor 110 may be accommodated in the accommodation space S2 formed between the pair of side bodies 91 and 92.

The opening 74 may be formed in the rear portion of the front link 90, the drive motor 110 may be disposed to pass through the opening 74, and the remaining portion of the drive motor 110 may be disposed outside the front link 90.

The drive wheel 120 may be directly connected to the rotation shaft of the driving motor 110 or may be connected through a separate reducer, and may be rotated about the horizontal shaft when the drive motor 110 is driven.

The drive wheel 120 may be positioned next to the rear portion of the front link 90, and may be rotated on the side of the front link 90 when the drive motor 110 is driven.

Figure 9:
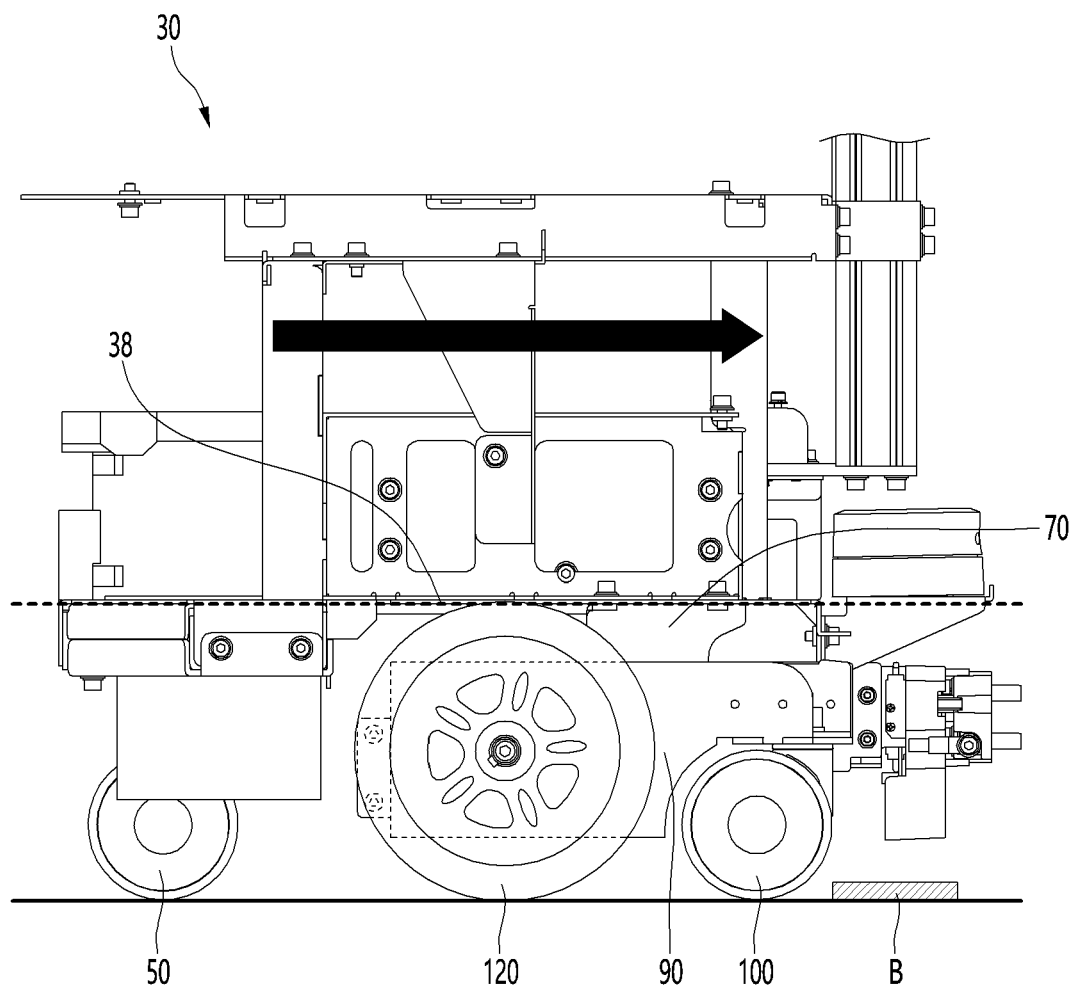
FIG. 9 is a view before a front caster according to the present embodiment encounters an obstacle.
Figure 10:
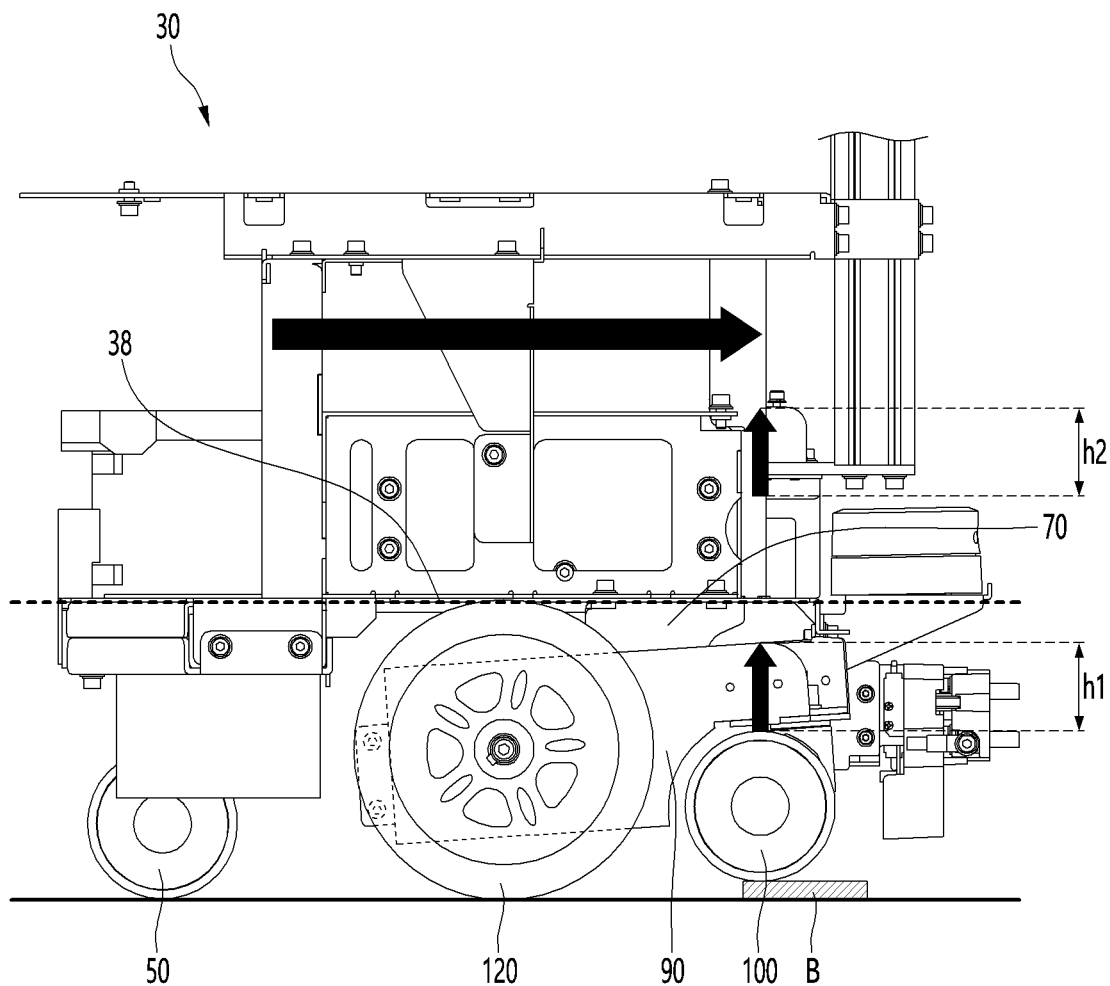
FIG. 10 is a view when a front caster according to the present embodiment rides over an obstacle.
Figure 11:
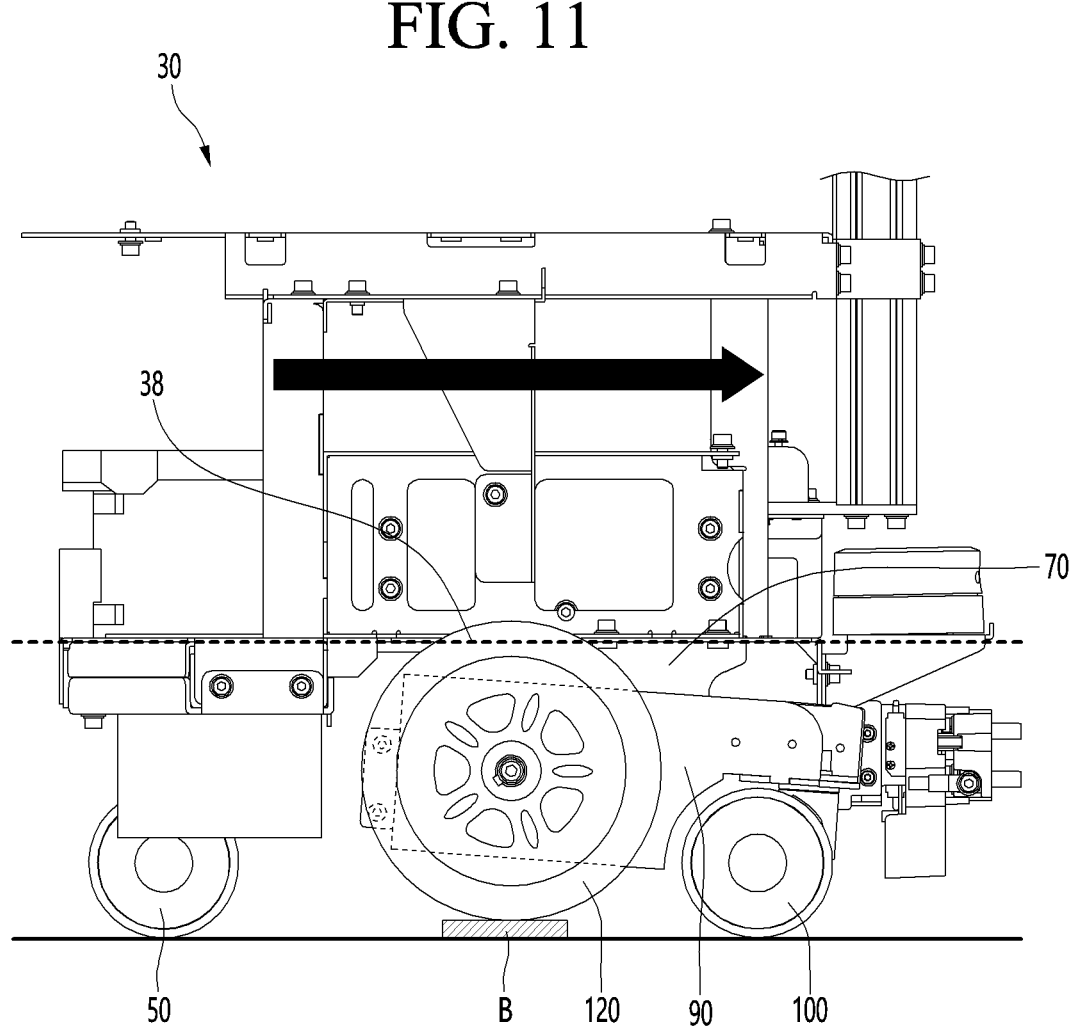
FIG. 11 is a view when a drive wheel rides over an obstacle after a front caster according to the present embodiment has ridden over an obstacle.

FIG. 9 is a view before a front caster according to the present embodiment encounters an obstacle, FIG. 10 is a view when a front caster according to the present embodiment rides over an obstacle, and FIG. 11 is a view when a drive wheel rides over an obstacle after a front caster according to the present embodiment has ridden over an obstacle.

When the robot 10a travels forward, the robot 10a may ride over an obstacle such as a door sill B (hereinafter referred to as an obstacle), and when the robot 10a rides over the obstacle B, the rear caster 50), the drive wheel 120 and the front caster 100 may meet the obstacle B from the front caster 100 as shown in FIG. 9.

As shown in FIG. 10, when the front caster 100 passes over the obstacle B, the lower end of the front caster 100 may be higher than the lower end of the drive wheel 120.

The front portion of the front link 90 may be higher than the rear portion with respect to the rotation damper 80, and the front link 90 may be inclined upward such that the front end of the front link 90 faces the upper front side of the robot 10a.

In the rotation damper 80, when the front link 90 is arranged to be inclined toward the upper front side of the robot 10a, the rotation damper 80 may be rotated the inner damper body 84 inside the outer damper body 82 by the connecting shafts P1 and P2 and, the inner damper body 84 may compress the plurality of elastic members 86. In this case, the elastic members 86 may absorb the shock caused by an obstacle B.

When the front caster 90 is passing through the obstacle B, the vertical displacement h1 of the front caster 100 may be greater than the vertical displacement h2 of the robot frame 30.

The vertical displacement h2 of the robot frame 30 and a delivery item loaded on the robot frame 30 may be reduced by the front link 90.

For example, when the front caster 100 is being located on the obstacle B, the front caster 100 may be raised by a first height h1 (for example, 20 mm) and a portion of the robot frame 30 located on the front caster 100 may be raised by a second height (e.g., 12 mm) lower than the first height, thus minimizing the possibility of falling of the delivery item.

When the front link 90 is inclined toward the upper front side, the rear portion of the front link 90 may press the drive wheel 120 in the downward direction, and thus, a grip force between the drive wheel 120 and the ground may be improved.

While the front caster 100 of the robot 10a rides over the obstacle B, the drive wheel 120 may allow the robot 10a to be continuously moved while the drive wheel 120 is being in contact with the ground.

As the robot 10a is being continuously moved, the front caster 100 may ride down the obstacle B and be positioned in front of the obstacle B, and the drive wheel 120 may climb the obstacle B as shown in FIG. 11.

When the drive wheel 120 passes over the obstacle B, the lower end of the drive wheel 120 may be higher than the lower end of the front caster 100 as shown in FIG. 11.

The rear portion of the front link 90 may be higher than the front portion with respect to the rotation damper 80, and the front link 90 may be inclined downward such that the front end of the front link 90 faces the lower front side of the robot 10a.

In the rotation damper 80, while the front link 90 is inclined toward the lower front side, the inner damper body 84 may be reversely rotated by the connecting shafts P1 and P2 inside the outer damper body 82. In addition, the inner damper body 84 may compress the plurality of elastic members 86, and in this case, the elastic members 86 may absorb shock caused by the obstacle B.

When the front link 90 is inclined toward the lower front side, the front portion of the front link 90 may press the front caster 100 in the downward direction, and thus, the grip force between the front caster 100 and the ground is improved.

The robot 10a may continuously rotate the drive wheel 120 while the drive wheel 120 crosses the obstacle B, and the robot 10a may travel stably in a state in which the front caster 100 is grounded with the ground.

Figure 12:
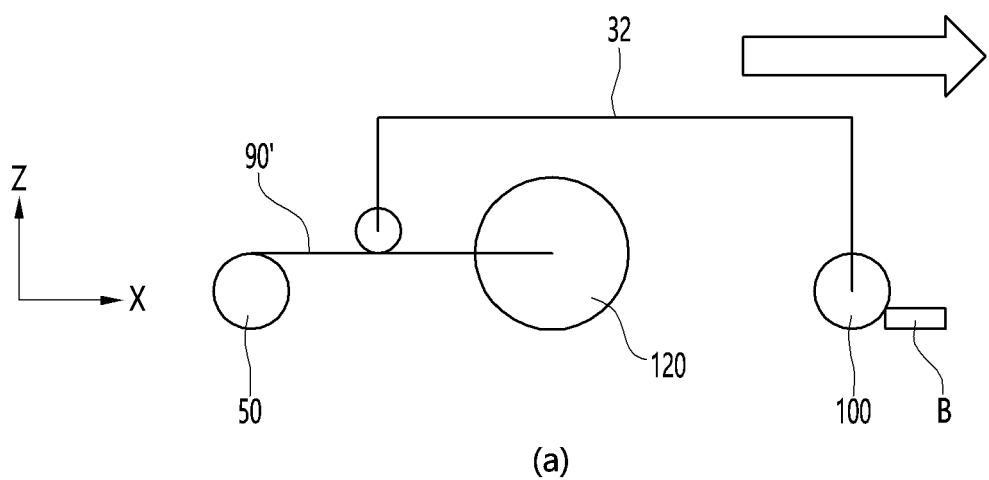
FIG. 12 is a view showing the present embodiment and the comparative example together.
Figure 12:
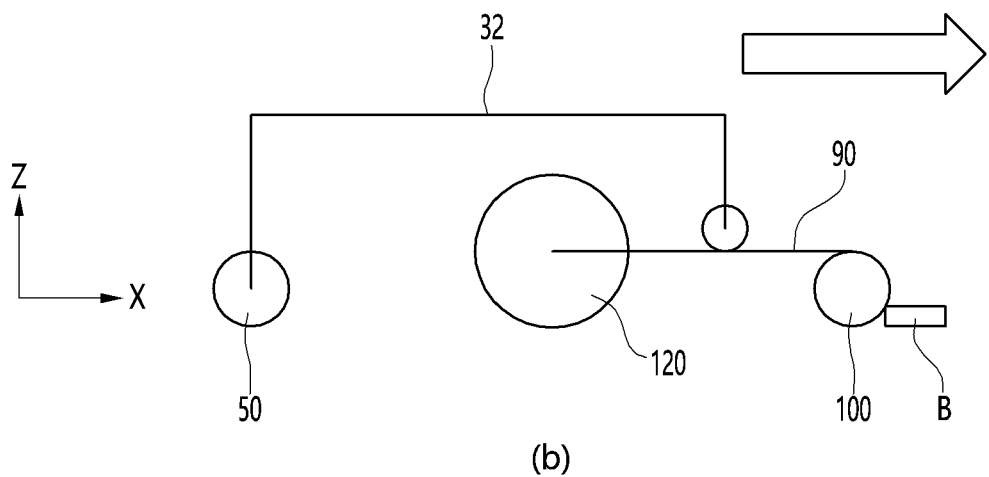

FIG. 12 is a view showing the present embodiment and the comparative example together.

In FIG. 12, (a) is a case in which the rear caster 50 and the drive motor 110 are connected through the rear link 90' of the comparative example, and a shock load received by the front caster 100 may be large. For example, when a robot weight is 60 kg, a load applied to each of the rear link 90' and the front caster 100 may be 30 kg, and the load applied to each of the rear caster 50 and the drive wheel 120 may be 15 k.

Since the load applied to the front caster 100 is large, the shock load received by the front caster 100 may be large, and the possibility of damage to the front caster 100 may be large.

In FIG. 12, (b) is a case in which the front caster 100 and the drive motor 110 are connected through the front link 90 of the present embodiment, and the shock load received by the front caster 100 may be smaller than that of the comparative example. For example, when a robot weight is 60 kg, a load applied to each of the front link 90 and the rear caster 50 may be 30 kg, and the load applied to each of the front caster 100 and the drive wheel 120 may be 15 k.

Since the load applied to the front caster 100 is smaller than that of the comparative example, the shock load received by the front caster 100 may be small, and the possibility of damage to the front caster 100 may be minimized.

According to the present embodiment, it is possible to minimize the vibration transmitted to the robot frame by absorbing a shock when the robot passes through an obstacle.

In addition, even when the front caster is lifted in the upward direction, the front link may press the drive motor in the downward direction, and the grip force of the drive wheel is maintained, so that the robot can travel stably.

In addition, a load applied to the front caster by the front link can be minimized, and when the front caster meets an obstacle, a shock load applied to the front caster is minimized, and damage and breakage to the front caster is minimized.

In addition, the side body of the front link may protect the rotation damper on the side of the rotation damper, and it is possible to minimize penetration of foreign substances such as dust into the rotation damper.

The above-disclosed subject matter is to be considered illustrative, and not restrictive, and the appended claims are intended to cover all such modifications, enhancements, and other implementations, which fall within the scope of the present disclosure.

Thus, the implementation of the present disclosure is to be considered illustrative, and not restrictive.

Therefore, the scope of the present disclosure is defined not by the detailed description of the invention but by the appended claims, and all differences within the scope will be construed as being included in the present disclosure.

What is claimed is:

1. A robot comprising:
   a robot frame having a bottom plate; and
   a rear caster and a wheel module disposed on the bottom plate;
   wherein the wheel module includes
   a link base mounted in the bottom plate to be spaced apart from the rear caster;
   a rotation damper mounted in the link base and having an elastic member accommodated therein;
   a front link connected to the rotation damper through a connecting shaft;
   a front caster mounted in a front portion of the front link;
   a drive motor mounted in a rear portion of the front link; and
   a drive wheel configured to be rotated by the drive motor,
   wherein the rotation damper further includes:
   an outer damper body having a space therein; and
   an inner damper body accommodated in the space, the connecting shaft being connected to the inner damper body, and
   wherein the elastic member is disposed between the outer damper body and the inner damper body.

2. The robot of claim 1, wherein the front link is spaced apart from the bottom plate in a vertical direction.

3. The robot of claim 1, wherein the outer damper body and the inner damper body have a polygonal shape;
   wherein the elastic member is one of a plurality of elastic members that are provided between the outer damper body and the inner damper body, and
   wherein the plurality of elastic members are spaced apart from one another.

4. The robot of claim 1, wherein the rotation damper further includes a damper case coupled to the link base to accommodate the outer damper body, the elastic member, and the inner damper body.

5. A robot comprising:
   a robot frame having a bottom plate; and
   a rear caster and a wheel module disposed on the bottom plate;
   wherein the wheel module includes
   a link base mounted in the bottom plate to be spaced apart from the rear caster;
   a rotation damper mounted in the link base and having an elastic member accommodated therein;
   a front link connected to the rotation damper through a connecting shaft
   a front caster mounted in a front portion of the front link;
   a drive motor mounted in a rear portion of the front link; and
   a drive wheel configured to be rotated by the drive motor,
   wherein the front link includes:
   a pair of side bodies spaced apart from each other, and
   a lower body configured to connect lower ends of the pair of side bodies, and
   wherein an accommodation space in which the rotation damper is accommodated is formed between the pair of side bodies.

6. The robot of claim 5, wherein an opening through which a motor passes is formed in an inner side body of the pair of side bodies of the front link.

7. The robot of claim 5, wherein the link base includes
an upper fastening portion fastened to the bottom plate; and
a lower accommodation portion in which the rotation damper is accommodated.

8. The robot of claim 7, wherein the lower accommodation portion is disposed between the pair of bodies, and
wherein the pair of side bodies is configured to shield between the lower accommodation portion and the rotation damper.

9. The robot of claim 5, wherein a pair of connecting shafts are provided, and wherein a pair of through-holes through which the pair of connecting shafts pass are formed in the pair of side bodies.

* * * * *